(12) United States Patent
Nieto et al.

(10) Patent No.: US 10,424,436 B2
(45) Date of Patent: Sep. 24, 2019

(54) ELECTRIC VEHICLE CHARGING STATION WITH MEDIUM VOLTAGE INPUT

(71) Applicant: ABB Schweiz AG, Baden (CH)

(72) Inventors: Carlos Nieto, Harjumaa (EE); Danel Turk, Talinn (EE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/084,088

(22) PCT Filed: Dec. 11, 2017

(86) PCT No.: PCT/EP2017/082155
§ 371 (c)(1),
(2) Date: Sep. 11, 2018

(87) PCT Pub. No.: WO2018/114414
PCT Pub. Date: Jun. 28, 2018

(65) Prior Publication Data
US 2019/0077270 A1 Mar. 14, 2019

(30) Foreign Application Priority Data

Dec. 23, 2016 (EP) .................... 16206559

(51) Int. Cl.
H02J 7/02 (2016.01)
H01F 30/12 (2006.01)
(Continued)

(52) U.S. Cl.
CPC .......... *H01F 30/12* (2013.01); *B60L 11/1812* (2013.01); *B60L 11/1816* (2013.01); *B60L 53/14* (2019.02); *B60L 53/22* (2019.02); *B60L 53/53* (2019.02); *H02J 7/022* (2013.01); *B60L 1/00* (2013.01); *B60L 2210/20* (2013.01);
(Continued)

(58) Field of Classification Search
CPC ........... B60L 53/14; B60L 53/30; B60L 53/31
See application file for complete search history.

(56) References Cited

U.S. PATENT DOCUMENTS 7,619,319 B1 * 11/2009 Hunter .................... B60L 53/57
290/4 R
10,081,265 B2 * 9/2018 Oestreicher ............. B60L 53/20
(Continued)

FOREIGN PATENT DOCUMENTS

EP 1916760 A2 4/2008
EP 2434604 A1 3/2012
(Continued)

OTHER PUBLICATIONS

European Search Report Application No. EP16206559 Completed: Jul. 4, 2017; dated Jul. 11, 2017 7 pages.
(Continued)

Primary Examiner — Fritz M Fleming
(74) Attorney, Agent, or Firm — Whitmyer IP Group LLC

(57) ABSTRACT

The present disclosure relates to an electric vehicle charging station including a transformer. The transformer is a multi-winding transformer including one primary winding and a plurality of secondary windings. The secondary windings are electrically isolated from one another. The electric vehicle charging station further includes an AC/DC converter to which a secondary winding is connected.

19 Claims, 3 Drawing Sheets

(51) Int. Cl.
  *B60L 53/22* (2019.01)
  *B60L 53/53* (2019.01)
  *B60L 53/14* (2019.01)
  *B60L 11/18* (2006.01)
  *B60L 1/00* (2006.01)
(52) U.S. Cl.
  CPC ........ *B60L 2210/30* (2013.01); *Y02T 10/7005* (2013.01); *Y02T 10/7088* (2013.01); *Y02T 90/12* (2013.01); *Y02T 90/127* (2013.01); *Y02T 90/14* (2013.01)

(56) References Cited

U.S. PATENT DOCUMENTS

2013/0020989 A1* 1/2013 Xia ...................... H02M 7/2176
  320/109
2013/0257146 A1* 10/2013 Nojima .................. B60L 53/11
  307/9.1

FOREIGN PATENT DOCUMENTS

| EP | 2567856 A1 | 3/2013 |
| JP | H0965509 A | 3/1997 |
| WO | 2010114454 A1 | 10/2010 |
| WO | 2014170320 A1 | 10/2014 |

OTHER PUBLICATIONS

International Search Report and Written Opinion of the International Searching Authority Application No. PCT/EP2017/082155 Completed:Mar. 8, 2018; dated Mar. 16, 2018 14 pages.
The People's Republic of China Office Action & Translation Application No. 2017800194282 dated May 23, 2019 6 Pages.
International Preliminary Report on Patentability & Written Opinion of the International Searching Authority Application No. PCT/EP2017/082155 issued Jun. 25, 2019; dated Jul. 4, 2019 8 pages.

* cited by examiner

ELECTRIC VEHICLE CHARGING STATION WITH MEDIUM VOLTAGE INPUT

TECHNICAL FIELD

The present invention pertains to a charging station for electric vehicles, in particular a station for charging electric cars or larger electric transport vehicles.

BACKGROUND

Conventional charging stations for electric vehicles typically comprise at least two separate outdoor housing units. There is one substation housing in the form of a small house with a footprint of a few square meters that contains a transformer. The transformer type conventionally used is a single-winding transformer, which means that the number of primary windings equals the number of secondary windings. The transformer is responsible for extracting electrical power from the electrical power grid and providing low voltage to a number of converters. The converters are in turn housed in a smaller outdoor converter cabinet positioned next to the substation housing. The converters provide DC current to a battery of an electric vehicle to be charged.

SUMMARY

An object of the invention is to provide an electric vehicle charging station of smaller footprint than earlier possible. Another object is to facilitate scalability, so that the charging station can more easily be adapted to needs as regards number of vehicles to be charged, output charging power, etc. Other objects and advantages achieved will become clear from the below.

The objects are achieved by an electric vehicle charging station comprising a transformer in the form of a multi-winding transformer. Such a transformer comprises one primary winding and a plurality of secondary windings. Importantly, said secondary windings are electrically isolated from one another. The electric vehicle charging station further comprises an AC/DC converter to which a secondary winding is connected.

Preferably, the sum of power rating of the primary winding is lower than the sum power rating of the secondary windings. In this way, the size of the multi-winding transformer can be reduced. In a situation where all AC/DC converters are used to charge electric vehicles at the same time, the output power per AC/DC converter can be reduced. In this way it is ensured that the sum of the actual power drawn by all the AC/DC converters on the secondary side does not exceed the power rating of the sum of the primary side windings. An overall system controller may be provided to control the current per AC/DC converter, taking the overall power output into consideration.

Since the secondary windings of the multi-winding transformer are electrically isolated from one another and then can be connected to an AC/DC converter, no isolation of the secondary windings needs be provided for in the AC/DC converter, as is the case in today's charging stations. The electrically isolated secondary windings, or in other words galvanically isolated transformer outputs, make possible the use of simpler and more compact converters. Thereby, the footprint of the charging station is reduced.

The multi-winding transformer with electrically isolated secondary windings further makes possible the inclusion of the multi-winding transformer and the converters in the same housing. This reduces the footprint of the total charging station even more. There is no need for one or more separate outdoor converter cabinets.

One key advantage of the present invention is that multiple battery chargers (AC/DC converters) can operate simultaneously, charging multiple vehicles in parallel. For example, there may be provided at least two AC/DC converters which can work in parallel at the same time to charge two vehicles in parallel. Preferably, the at least two converters are controlled individually.

The electric vehicle charging station can also be referred to as an electric vehicle prefabricated charging station.

BRIEF DESCRIPTION OF THE DRAWINGS

The invention will be explained in greater detail with reference to the accompanying drawings, wherein.

DETAILED DESCRIPTION

Figure 1:
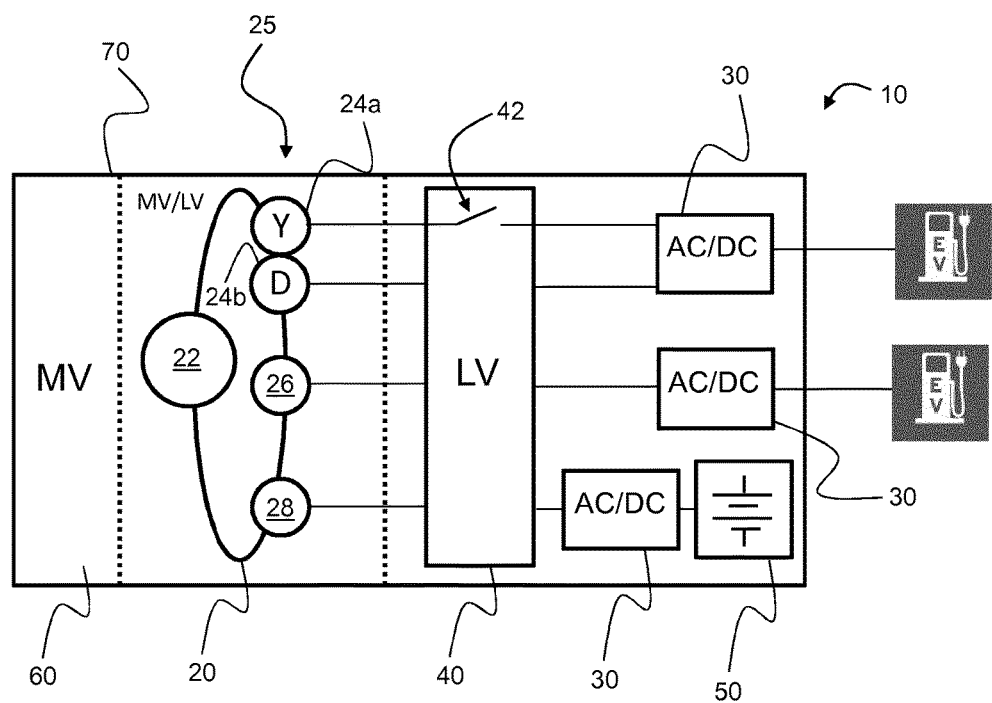
FIG. 1 shows one embodiment of the invention by schematically illustrating the electric and electronic components of an electric vehicle charging station.
Figure 2:
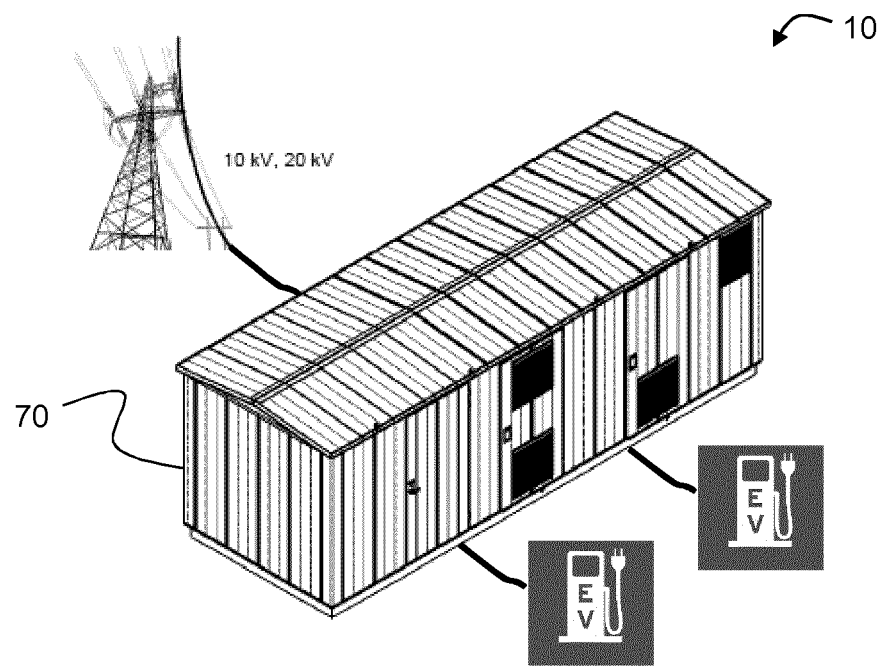
FIG. 2 shows one example of the station in FIG. 1 in a perspective view.

One embodiment of an electric vehicle charging station 10 in accordance with the present invention is shown in FIGS. 1 and 2.

The internal components of the station 10 will be described with reference to FIG. 1. To the left, a medium voltage (MV) input switchgear 60 is illustrated. The switchgear 60 is connected to a power grid (illustrated in FIG. 2). The switchgear 60 provides electrical power to a multi-winding transformer 20 located to the right of the switchgear 60.

Other lay-outs are also conceivable, but a preferred solution is to position the switchgear 60 at one end of the station 10 with the transformer 20 immediately adjacent, as is shown in FIG. 1. It is to be pointed out that FIG. 2 only schematically illustrates the incoming connection from the power grid and the outgoing connection to the two charging poles. Many lay-outs are possible, but a preferred solution is to position the internal components of the station as illustrated in FIG. 1.

The multi-winding transformer 20 comprises one primary winding 22 and a plurality of secondary windings 24a, 24b, 26, 28. In the illustrated example, there is a first secondary winding 24a, a second secondary winding 24b, a third secondary winding 26 and a fourth secondary winding 28. The secondary windings 24a, 24b, 26, 28 are galvanically isolated from one another. The general reference number 25 is also used for denoting all secondary windings 24a, 24b, 26, 28, 29.

As is understood by the skilled person, in a three phase system there is one primary winding per phase, thus three primary windings in total. The secondary windings are correspondingly multiplied by three. For ease of illustration, only one phase is shown here.

The multi-winding transformer of the present invention maybe a three-phase multi-winding transformer. More precisely a three-phase multiwinding step-down transformer. A multi-winding transformer can also be named multiple winding transformer.

The secondary windings 24a, 24b, 26, 28 are connected to a low voltage (LV) switchboard 40 which comprises a number of switches 42. Only one switch 42 is illustrated here. Each secondary winding 24a, 24b, 26, 28, or multiwinding transformer output, is connected to a separate switch within the switchboard 40. Said switch 42 may be a circuit breaker or a fuse-switch disconnector. The switchboard is preferably positioned immediately adjacent to the multi-winding transformer 20, as is shown here.

After the switchboard 40, in the rightmost end of the station 10 illustrated in FIG. 1, there is a number of AC/DC converters 30. As can be seen, each secondary winding 24*a*, 24*b*, 26, 28 is electrically connected to an AC/DC converter. However, as will be described with reference to FIG. 3, one or more secondary winding 29 may alternatively be connected to another load, such as auxiliary equipment. Examples of auxiliary equipment include control systems, cooling systems and fire extinguishing systems. Furthermore, the auxiliary equipment could include devices located physically outside the charging station, such as street lights, security camera's, commercial signs, etc.

The above mentioned control systems could include a system controller (not shown) arranged within the housing enclosure 70 to control inter alia each one of the converters 30.

In an alternative embodiment, not shown here, the secondary windings 24*a*, 24*b*, 26, 28 could be connected directly to the converters 30, without an intermediate switchboard 40.

However, the switchboard brings the advantage that the converters 30 can be individually isolated for maintenance and scalability (adding additional converters after delivery of the station).

The vertical dashed lines in FIG. 1 denote optional separation walls. Such walls can be used to provide segregated compartments for the components of the station 10. In the example illustrated in FIG. 1, there is a medium voltage compartment, a transformer compartment and a low voltage compartment. The walls can be manufactured from steel or concrete. One advantage of providing such compartments is that it is possible to control the temperature and the humidity in the compartments individually, which may be beneficial as the equipment require different environmental conditions. Also, there may be different safety regulations that apply to the different compartments. For example, one operator may be authorized to enter the low voltage compartment but not the medium voltage compartment.

The converters 30 output DC for charging the batteries of the electric vehicles. In the figures, the charging poles which are fed by the converters 30 are illustrated similar to conventional gasoline pumps marked "EV". The charging poles are provided with an interface for charging the electric vehicles. The interface may for instance be a cable connection (as illustrated in the drawings) or an inductive connection (wireless).

As can be seen in FIG. 1, the topmost secondary winding 24 consists of two secondary windings 24*a*, 24*b*. Said two secondary windings 24*a*, 24*b* are connected to the same converter 30 via individual switches within the switchboard 40. Again, only one switch 42 (to which the upper one 24*a* of the two secondary windings is connected) is shown in the switchboard but there is another switch located next to it for connecting the other one (24*b*) of said two secondary windings 24*a*, 24*b* to the converter 30.

By connecting two secondary windings 24*a*, 24*b* to the same converter, a 6 phase (2 windings, 3 phases) output is achieved. This output is connected to the input of one converter 30 resulting in less ripple, and thus lower harmonic content in the DC current and therefore a smaller filter is required. Alternatively, there could also be three secondary windings (not illustrated) connected to the same converter forming a 9 phase output minimizing said ripple even more.

As can further be seen in FIG. 1, the secondary winding 26 located below the aforementioned ones 24*a*, 24*b*, is solely connected to one converter 30.

As is shown in the lower right-most corner of the station 10 in FIG. 1, the station 10 may also comprise an energy storage 50. The energy storage may be a battery 50. One secondary winding 28 is connected to the energy storage 50 via a converter 30. By providing an energy storage 50 it is possible to store for example renewable energy in the station 10 that can be fed to the loads (e.g. vehicles or auxiliary equipment) if needed. Energy stored in the energy storage 50 can also be used to ensure high power quality in case of system fluctuations. Furthermore, the energy storage 50 can be used to reduce the so called power fee, since peak power requirements of charged vehicles can be smoothed out. The station may be connected to, or even furnished with, solar panels or wind turbines charging the energy storage 50.

Surrounding all the equipment mentioned above, there is a housing enclosure 70. The charging poles may be positioned separate for the housing enclosure 70, attached to the housing enclosure 70 or within the housing enclosure 70. Said housing enclosure could also be referred to as an electric vehicle charging station housing enclosure 70, to reflect that all power equipment of the charging station is enclosed within it.

An advantage of housing the medium voltage (MV) input switchgear 60, the multi-winding transformer 20, the low voltage (LV) switchboard 40, the converters 30 and the optional energy storage 50 in the same housing enclosure 70 is that a complete electric vehicle charging station 10 can be assembled and tested in a factory, and then be delivered ready for on-site installation. Thereby, on-site work is heavily reduced. Also, as already mentioned, the electric vehicle charging station 10 is very compact.

Figure 3:
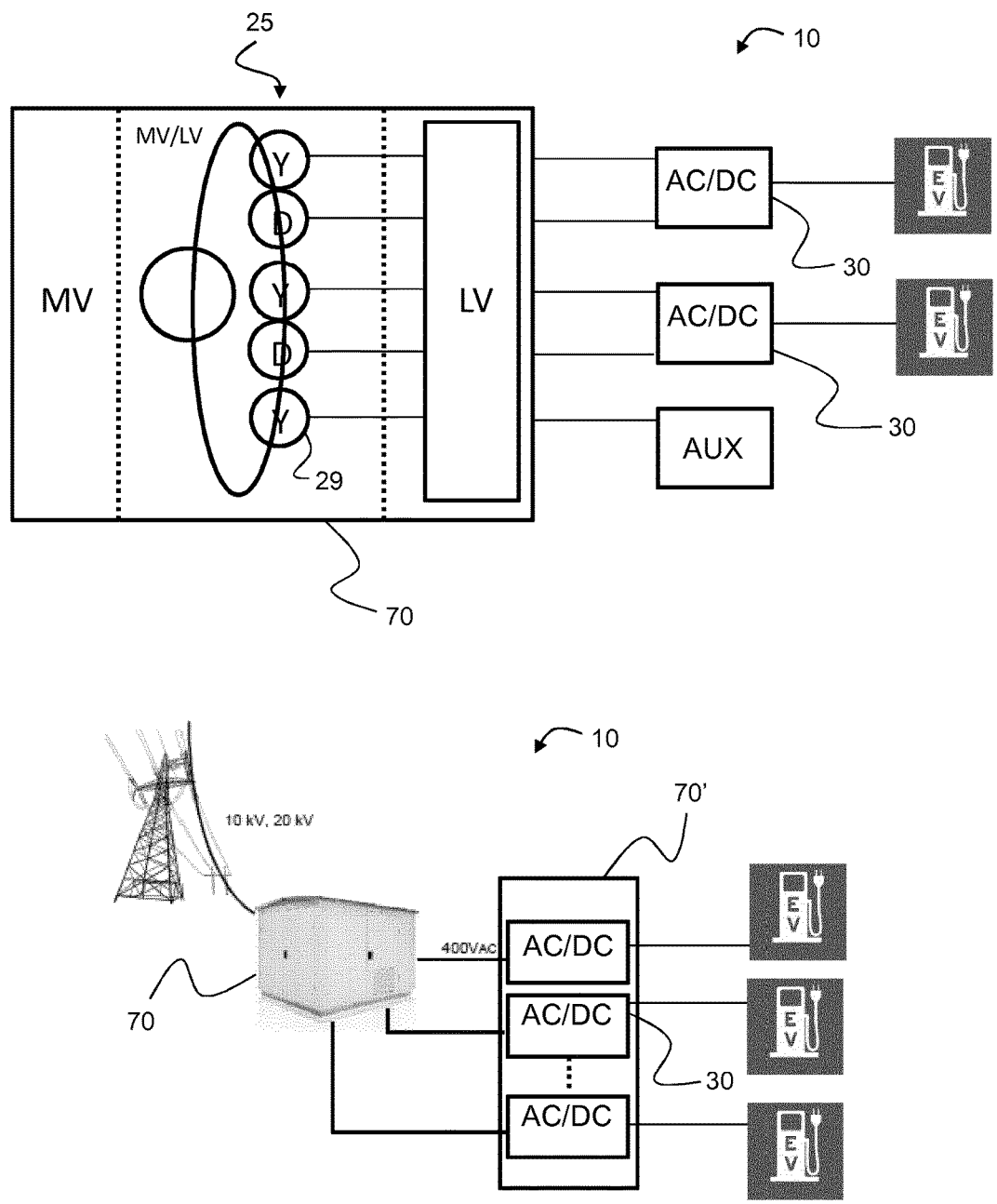
FIG. 3 shows another embodiment of the invention.

Another embodiment of an electric vehicle charging station 10 in accordance with the present invention is shown in FIG. 3. The upper part of FIG. 3 schematically illustrates the electric and electronic components of an electric vehicle charging station 10 (comparable to FIG. 1) and the lower part of FIG. 3 shows one example of the station 10 in perspective view (comparable to FIG. 2).

In the embodiment of FIG. 3 the converters 30 (two illustrated in the upper part of FIG. 3) are not housed within the aforementioned housing enclosure 70. Instead the converters are positioned either in individual converter enclosures or in a common converter enclosure 70' outdoor the housing enclosure 70. Such a common converter enclosure 70' is illustrated in the lower part of FIG. 3. Here, the common converter enclosure 70' contains tree converters 30. As can be seen in FIG. 3, the lowermost secondary winding 29 is connected directly to an auxiliary load 50 or auxiliary equipment 50. By "directly" is meant that the secondary winding 29 is connected to the auxiliary equipment 50 without passing through a converter.

The housing enclosure 70 is preferably made from concrete, steel or composite materials.

In this disclosure, by medium voltage is generally meant 1-72 kV AC. However, the most likely level of the medium voltage to which the station will be connected is 10 or 20 kV AC. Typically, the primary winding voltage of the multi-winding transformer is at least a factor of 10 higher than the secondary winding voltage. The typical power output to the electric car charged by the station is 150 to 350 kW.

The invention claimed is:

1. An electric vehicle charging station comprising:
   a transformer, wherein:
   said transformer is a multi-winding transformer including one primary winding and a plurality of secondary windings, and
   said secondary windings are electrically isolated from one another, an AC/DC converter to which a secondary winding is connected,
   a switchboard with a plurality of switches, each secondary winding being connected to a separate switch of the switchboard, and
   a medium voltage input switchgear, said medium voltage input switchgear being connected to the primary winding of the multi-winding transformer, wherein a voltage level of the medium voltage input switchgear is 1-72 kV AC.

2. The electric vehicle charging station of claim 1, further including an auxiliary power equipment, wherein at least one of the secondary winding is connected to an AC/DC converter, and one of the secondary windings is connected directly to the auxiliary power equipment without passing through an AC/DC converter.

3. The electric vehicle charging station of claim 2, wherein four secondary windings are connected to AC/DC converters.

4. The electric vehicle charging station of claim 2, further including an energy storage connected to one of the secondary windings.

5. The electric vehicle charging station of claim 4, further including a housing enclosure, wherein said energy storage is arranged within the housing enclosure.

6. The electric vehicle charging station of claim 2, wherein the multi-winding transformer and the secondary windings are configured such that the output of the multi-winding transformer can be either one or several of 3 phase, 6 phase or 9 phase.

7. The electric vehicle charging station of claim 2 further including a housing enclosure and at least two AC/DC converters, a medium voltage input switchgear and a low voltage switchboard, all housed in the same housing enclosure together with the multi-winding transformer.

8. The electric vehicle charging station of claim 1, wherein four secondary windings are connected to AC/DC converters.

9. The electric vehicle charging station of claim 1, further including a housing enclosure within which the multi-winding transformer, the switchboard, and the medium voltage input switchgear are arranged.

10. The electric vehicle charging station of claim 9, including at least two AC/DC converters, each AC/DC converter being connected to a separate one of the secondary windings.

11. The electric vehicle charging station of claim 10, wherein said at least two AC/DC converters are arranged within the housing enclosure.

12. The electric vehicle charging station of claim 1, further including an energy storage connected to one of the secondary windings.

13. The electric vehicle charging station of claim 12, further including a housing enclosure, wherein said energy storage is arranged within the housing enclosure.

14. The electric vehicle charging station of claim 1, wherein the multi-winding transformer and the secondary windings are configured such that the output of the multi-winding transformer can be either one or several of 3 phase, 6 phase or 9 phase.

15. The electric vehicle charging station of claim 1 further including a housing enclosure and at least two AC/DC converters, a medium voltage input switchgear and a low voltage switchboard, all housed in the same housing enclosure together with the multi-winding transformer.

16. The electric vehicle charging station of claim 1, wherein the multi-winding transformer is a three-phase multi-winding transformer.

17. The electric vehicle charging station of claim 1, wherein a power output of each AC/DC converter to an electric vehicle to be charged lies in a range of 150 to 350 kW.

18. The electric vehicle charging station of claim 1, further including a separation wall which provides at least two segregated compartments for different components of the electric vehicle charging station.

19. The electric vehicle charging station of claim 1, further including a controller to control a current per AC/DC converter such that a sum of power drawn by all AC/DC converters does not exceed a power rating of the primary winding.

* * * * *